3,112,266
LOW FLUID LOSS COMPOSITIONS
David T. Oakes, El Dorado, Ark., assignor to Monsanto Chemical Company, St. Louis, Mo., a corporation of Delaware
No Drawing. Filed Nov. 22, 1957, Ser. No. 698,054
2 Claims. (Cl. 252—8.55)

The present invention relates to well-treating compositions and, more particularly, it is directed to compositions useful for the hydraulic fracturing of formations in oil wells, gas wells, etc.

The practice of creating new flow channels and crevices by hydraulic fracturing has become widespread and has proven of great value in stimulating the production of fluids from most formations. In the art of fracturing wells, a special fluid, commonly called a fracturing fluid, is usually pumped down the well into contact with the formation to be fractured and the pressure of the fluid is increased until the formation is fractured by hydraulic pressure. It is usually desirable to incorporate a propping material, such as sand, in the fracturing fluid, whereby the sand is carried into the fracture with the fracturing fluid. After the fracture has been extended to the extent desired, the pressure in the well bore is decreased. At least a portion of the propping material is deposited in the fracture for maintaining it open and enhancing the flow of formation fluids through the fracture into the well bore.

The characteristics required of fracturing fluids have become fairly well known. The type of fracture obtained is dependent to a large extent upon the penetrating characteristics of the fracturing fluid, i.e., the extent of fracture is influenced by the fluid-loss characteristics of the fracturing fluid. Fracturing fluids giving the most desirable type of fractures are those with low penetration characteristics or low filtration rates. Another important consideration is the viscous character of the fluid. Since the fracturing medium normally carries a propping agent such as sand, the typical fracturing fluids must also possess sufficient viscosity and gel strength to support the granular propping agent while keeping a low coefficient of friction. In addition, the fluid should require, for economic reasons, only relatively inexpensive components and it should be easy to prepare in the field.

It is an object of this invention to provide an oil-base well-treating fluid. It is a further object of this invention to provide oil-base fracturing-fluid compositions which sufficiently meet all of the foregoing requirements and possess all of the desired properties. Other objects and advantages of the invention will become apparent from the following description thereof.

The well-treating compositions of this invention comprise a major portion of petroleum oil having dispersed therein a minor amount of a mixture of (a) a finely-divided asphalt containing homogeneously dispersed therein from about 45% to about 60% by weight of asphaltenes and having a particle size such that substantially all of the material passes through a 60-mesh screen and (b) an oil-insoluble or sparingly oil-soluble, finely-divided, inert solid having a particle size such that substantially all of the material passes through a 140-mesh screen.

The following examples are presented to illustrate the low fluid-loss characteristics of the novel well-treating compositions of this invention.

EXAMPLE I

An ink asphalt having homogeneously dispersed therein 50% by weight asphaltenes was ground so that the particles passed through a 100-mesh screen. A separate asphaltene fraction was ground so that the particles passed through a 325-mesh screen. Portions of the ink asphalt and portions of the asphaltenes were mechanically dispersed in diesel oil and the fluid-loss characteristics of the resultant compositions determined at 80° F. and 140° F. At 80° F. the fluid loss was determined in the conventional manner by filtration using a standard API filter press closed with a Whatman No. 50 filter paper. The fluid loss was reported in cc. collected in 30 minutes at 100 p.s.i.g. At 140° F. the fluid-loss characteristics were determined in the conventional manner by filtration using a Baroid high temperature filter press closed with a Baroid No. 988 filter paper. Fluid-loss was reported in cc. collected in 30 minutes at 100 p.s.i.g. The results are set forth in Table I.

Table I

| Ink Asphalt (gms.) | Asphaltenes (gms.) | Diesel Oil (cc.) | Temp. (° F.) | 30-min. Fluid Loss (cc.) |
|---|---|---|---|---|
| 0.72 | 1.68 | 200 | 80 | 57.7 |
| 0.72 | 1.68 | 200 | 140 | 32.3 |
| 0.96 | 1.44 | 200 | 80 | 45.0 |
| 0.96 | 1.44 | 200 | 140 | 31.5 |
| 1.20 | 1.20 | 200 | 80 | 31.0 |
| 1.20 | 1.20 | 200 | 140 | 31.2 |
| 1.44 | 0.96 | 200 | 80 | 29.5 |
| 1.44 | 0.96 | 200 | 140 | 34.5 |
| 1.68 | 0.72 | 200 | 80 | 10.7 |
| 1.68 | 0.72 | 200 | 140 | 30.2 |
| 1.92 | 0.48 | 200 | 80 | 10.7 |
| 1.92 | 0.48 | 200 | 140 | 33.5 |

EXAMPLE II

The procedure set forth in Example I was repeated using an ink asphalt having homogeneously dispersed therein 50% by weight asphaltenes. In place of the separately added asphaltene fraction in Example I, sodium sulfate was used in this case. The ink asphalt was ground to a particle size such that it passed through a 100-mesh screen and the particles of sodium sulfate were such that they passed through a 325-mesh screen. The fluid-loss characteristics of well-treating compositions prepared from these materials are set forth in Table II.

Table II

| Sodium Sulfate (gms.) | Ink Asphalt (gms.) | Diesel Oil (cc.) | Temp. (° F.) | 30-min. Fluid Loss (cc.) |
|---|---|---|---|---|
| 1.20 | 1.20 | 200 | 80 | 11.2 |
| 1.20 | 1.20 | 200 | 140 | 29.8 |
| 0.96 | 1.44 | 200 | 80 | 11.4 |
| 0.96 | 1.44 | 200 | 140 | 17.5 |
| 0.90 | 1.50 | 200 | 80 | 22.5 |
| 0.90 | 1.50 | 200 | 140 | 46.5 |

EXAMPLE III

The effect of additive concentration on the fluid-loss characteristics of the novel well-treating compositions of this invention was determined on well-treating compositions as set forth in Example I containing varying quantities of a composition containing a 1:1 weight ratio of the ink asphalt used in the preceding examples to the separately added asphaltene fraction. The results are set forth in Table III.

*Table III*

EFFECT OF CONCENTRATION OF 1:1 RATIO OF INK ASPHALT TO ASPHALTENES

| Concentration (gms. 200 cc. Diesel) | Temp. (° F.) | 30-min. Fluid Loss (cc.) |
|---|---|---|
| 1.2 | 80 | 46.0 |
| 1.2 | 140 | 57.0 |
| 2.0 | 80 | 27.2 |
| 2.0 | 140 | 34.5 |
| 2.4 | 80 | 20.8 |
| 2.4 | 140 | 28.3 |
| 4.8 | 80 | 10.5 |
| 4.8 | 140 | 12.2 |

EXAMPLE IV

In the actual fracturing of a well using the low fluid-loss medium of this invention, the procedure is as follows:

The well-treating composition as described herein is pumped into the well through suitable tubing or casing to the elevation of a producing formation at a substantially constant rate. Sand or some other propping agent is incorporated in the fracturing fluid as it is pumped into the well. The sand or other agent is suspended in the fracturing fluid by virtue of the viscosity characteristics of the fluid and thus is carried into the fracture when the fracturing fluid enters the formation. Pumping or injection of the dispersion into the well is continued after the fracturing fluid reaches the selected formation thus causing the bottom-hole pressure to rise until the hydrostatic bottom-hole pressure is sufficient to cause the formation to part or fracture. Upon the release of pressure, the sand holds open the fracture and provides a more permeable path for fluid flow. Fluid pressure measurements are continuously made at the surface and when fracture occurs the surface pressure decreases. Continued injection of the fluid into the fracture will extend the fracture. The pressure required to fracture the formation, commonly termed the "formation breakdown pressure," is roughly equivalent in pounds per square inch to the depth of the formation in feet.

The composition of the low fluid-loss media of this invention can be varied substantially without departing from the scope thereof. The asphalts used in the compositions of this invention are the solid or semi-solid residue after the volatile constituents of a crude oil have been removed. The asphalt may be partially oxidized and/or polymerized by heating and blowing to vary the asphaltene content. The asphalts used in preparing the composition of this invention are those which have homogeneously dispersed therein from about 45% to about 60% by weight of asphaltenes and have a particle size such that substantially all of the material passes through a standard 60 or finer mesh screen. As used throughout this specification and claims, asphaltenes are that fraction of an asphalt which is insoluble in hexane, exclusive of any ash that may be present.

Any oil-insoluble or sparingly oil-soluble, finely-divided, inert solid having a particle size such that substantially all of the material passes through a standard 140 or finer mesh screen can be used with the asphalts described above in preparing the novel compositions of this invention. Solids as described wherein a substantial portion of the solids has a particle size of less than 0.005 micron are not particularly advantageous in the practice of this invention. Substantially oil-insoluble solids which can be used in the novel compositions of this invention include sodium chloride, sodium sulfate, molecularly dehydrated phosphates, insoluble metaphosphates, carbon black, mica, spent catalyst, walnut shells, carboxymethyl cellulose, asphaltene and so forth. Of these materials, those that are water-soluble or sparingly oil-soluble are preferred. The asphaltenes used as the finely-divided, substantially oil-insoluble, inert solid in the compositions of this invention are separate and distinct from the asphaltenes homogeneously dispersed in the asphalt described above.

The petroleum oil which may be used as the carrier in the improved oil-treating compositions of this invention can be any petroleum hydrocarbon liquid. Crude oil which is normally available in the vicinity of the well-working operation can be used. Refined petroleum products, such as kerosene, pale oil, diesel oil, fuel oil and so forth can also be used.

In the novel compositions of this invention, the ratio of the asphalt to the finely-divided, inert, substantially oil-insoluble material can be substantially varied. Ratios of asphalt: finely-divided, substantially oil-insoluble solids ranging from about 0.5:1 to about 8:1 are applicable with a range of from about 0.5:1 to about 4:1 being preferred.

The total solids concentration, that is, the concentration of the asphalt plus finely-divided, substantially oil-insoluble, inert, solid material, in the well-treating composition can be substantially varied. The oil-base dispersion can contain as low as 0.5% by weight of the above described solids and as high as approximately 25% by weight of the above described solids. Concentrations ranging from about 1% to about 15% by weight of total composition are particularly useful.

The well-treating compositions of this invention may be used as such as described or they may be incorporated as an additive to impart increased viscosity and/or reduced fluid loss in any oil-base fluid used in well-treating operations.

What is claimed is:

1. A well fracturing fluid composition consisting essentially of a major portion of a liquid hydrocarbon petroleum oil having dispersed therein from about 0.5 to about 25% by weight of total composition of a mixture of (a) a finely-divided solid asphalt containing homogenously dispersed therein from about 45% to about 60% by weight of asphaltenes, said finely-divided solid asphalt having a particle size such that substantially all of the material passes through a 60-mesh screen and (b) a finely-divided solid asphaltene having a particle size of at least 0.005 micron, but having a particle size such that substantially all of the material passes through a 140-mesh screen, wherein the weight ratio of said finely-divided solid asphalt to said finely-divided solid asphaltene in said mixture is in the range from about 0.5:1 to about 8:1.

2. A method for increasing the productivity of a formation penetrated by a well which consists essentially of introducing into a confined zone of said well a well fracturing fluid composition consisting essentially of a major proportion of a liquid hydrocarbon petroleum oil having dispersed therein from about 0.5 to about 25% by weight of total composition of a mixture of (a) a finely-divided solid asphalt containing homogenously dispersed therein from about 45% to about 60% by weight of asphaltenes, said solid asphalt having a particle size such that substantially all of the material passes through a 60-mesh standard screen and (b) a finely-divided solid asphaltene having a particle size of at least 0.005 micron but having a particle size such that substantially all of the material passes through a 140-mesh standard screen, wherein the weight ratio of said finely-divided solid asphalt to said finely-divided solid asphaltene in said mixture is in the range from about 0.5:1 to about 8:1, and thereafter applying a pressure to said well fracturing fluid composition until a pressure drop indicates that the said formation has been fractured.

References Cited in the file of this patent

UNITED STATES PATENTS

| | | |
|---|---|---|
| 2,223,027 | Dawson et al. | Nov. 26, 1940 |
| 2,515,742 | Snyder | July 18, 1950 |
| 2,667,224 | Howard | Jan. 26, 1954 |
| 2,779,735 | Brown et al. | Jan. 29, 1957 |
| 2,793,996 | Lummus | May 28, 1957 |
| 2,801,218 | Menaul | July 30, 1957 |
| 2,811,207 | Clark | Oct. 29, 1957 |